(12) United States Patent
Murshid et al.

(10) Patent No.: US 9,529,147 B2
(45) Date of Patent: Dec. 27, 2016

(54) ALL-OPTICAL SPATIAL DOMAIN MULTIPLEXING DE-MULTIPLEXER

(71) Applicant: Florida Institute of Technology, Inc., Melbourne, FL (US)

(72) Inventors: Syed H. Murshid, Palm Bay, FL (US); Gregory L. Lovell, Melbourne, FL (US)

(73) Assignee: Florida Institute of Technology, Inc., Melbourne, FL (US)

( * ) Notice: Subject to any disclaimer, the term of this patent is extended or adjusted under 35 U.S.C. 154(b) by 63 days.

(21) Appl. No.: 14/700,106

(22) Filed: Apr. 29, 2015

(65) Prior Publication Data

US 2015/0309249 A1 Oct. 29, 2015

Related U.S. Application Data

(60) Provisional application No. 61/985,751, filed on Apr. 29, 2014.

(51) Int. Cl.
*H04Q 11/00* (2006.01)
*H04B 10/2581* (2013.01)
(Continued)

(52) U.S. Cl.
CPC ........... *G02B 6/02042* (2013.01); *G02B 6/036* (2013.01); *H04B 10/2581* (2013.01); *H04J 14/04* (2013.01);
(Continued)

(58) Field of Classification Search
None
See application file for complete search history.

(56) References Cited

U.S. PATENT DOCUMENTS 4,000,416 A * 12/1976 Goell ................. G02B 6/02042
340/635
4,149,772 A * 4/1979 Iyengar .............. G02B 6/02042
385/127

(Continued)

OTHER PUBLICATIONS http://www.optiwave.com/products/bpm_overview.html, date downloaded Apr. 27, 2015.
(Continued)

*Primary Examiner* — Darren E Wolf
(74) *Attorney, Agent, or Firm* — Lowndes, Drosdick, Doster, Kantor & Reed, P.A.; Courtney M. Dunn; Stephen C. Thomas

(57) ABSTRACT

An optical-to-optical inline spatial domain multiplexing (SDM) de-multiplexer for SDM communication comprising a plurality of concentric core layers each having a beveled output end and a cladding layer concentrically surrounding each core layer. The cladding layer has an index that is lower than the index of the core layer it surrounds. Also included is a system for SDM communication comprising at least one optical source to transmit optical energy, an SDM optical carrier fiber to receive optical energy from the source and output a plurality of SDM signals, a SDM de-multiplexer as described above wherein the SDM signals output from the carrier fiber are each incident upon one of the core layers, optical output fibers positioned to couple SDM signals from each cladding layer, and a photodetector communicatively coupled to the outputs of the optical output fibers to couple the SDM signals output from the optical output fibers.

16 Claims, 19 Drawing Sheets

(51) Int. Cl.
  *H04J 14/04* (2006.01)
  *G02B 6/02* (2006.01)
  *G02B 6/036* (2006.01)

(52) U.S. Cl.
  CPC ... *H04Q 11/0005* (2013.01); *H04Q 2011/0024* (2013.01)

(56) References Cited

U.S. PATENT DOCUMENTS

| | | |
|---|---|---|
| 7,639,909 B2 | 12/2009 | Murshid et al. |
| 8,278,728 B2 | 10/2012 | Murshid |
| 8,396,371 B2 | 3/2013 | Murshid et al. |

OTHER PUBLICATIONS

Syed H. Murshid, Hari P. Muralikrishnan, Samuel P. Kozaitis; "Orbital angular momentum in four channel spatial domain multiplexing system for multi-terabit per second communication architectures." Proc. SPIE 8397, Enabling Photonics Technologies for Defense, Security, and Aerospace Applications VIII, 839703 (Jun. 8, 2012); oi:10.1117/12.920812.

M. Koshiba, K. Saitoh, Y. Kokubun, "Heterogenous multi-core fibers: Proposal and design principle" IEICE Electron. Exp., 6(2), pp. 98-103 (2009).

Y. Awaji, N. Wada, Y. Toda, and T. Hayashi, "World first mode/spatial division multiplexing in multi-core fiber using Laguerre-Gaussian mode," in 37th European Conference and Exposition on Optical Communications, OSA Technical Digest (CD) (Optical Society of America, 2011), paper We.10.P1.55.

Murshid, S. H., Grossman, B. and Narakorn, P., "Spatial Domain Multiplexing: a new dimension in fiber optic multiplexing", Journal of Optics and Laser Technology, 40(8), 1030-1036, (2008).

Murshid, S. H., Zahir, E., Chakravarty, A., "SDM propagation model for multiple channels using ray theory." Proc. SPIE 7682, Photonic Microdevices/Microstructures for Sensing II, 76820V (2010).

Murshid, S. H., Biswas, R., and Chakravarty, A., "CAD model for co-propagating spatially multiplexed channels of same wavelength over standard multimode fibers." Proc. SPIE 7339 Enabling Photonics Technologies for Defense, Security, and Aerospace Applications V. (2009).

Alexeyev, A. N., Fadeyeva, T. A., Volyar, A. V., "Optical Vortices and the flow of their angular momentum in a multimode fiber.", Semiconductor Physics, Quantum Electronics & Optoelectronics. 1998. V1, N1. p. 82-89.

Murshid, S. H., Zahir, E., Biswas, R., and Chakravarty, A., "SDM propagation model for multiple channels using electromagnetic theory and vortex analysis" Proc. SPIE 7682, Photonic Microdevices/Microstructures for Sensing II, 76820U (2010).

Murshid S and Iqbal J. "Array of concentric CMOS photodiodes for detection and de-multiplexing of spatially modulated optical channels" Journal of Optics and Laser Technology, 41 (6), p. 764-769, Sep. 2009.

\* cited by examiner

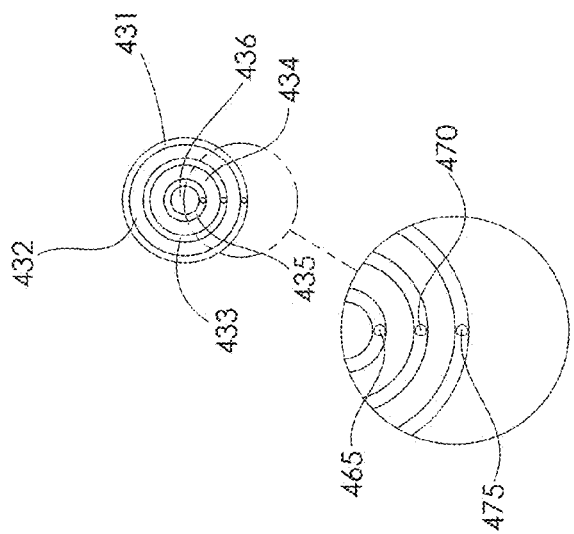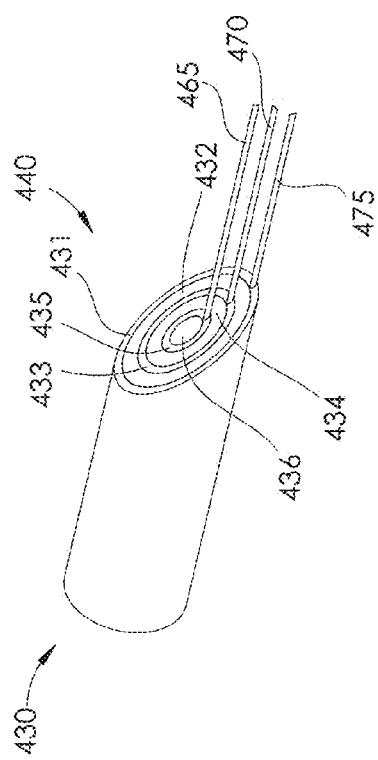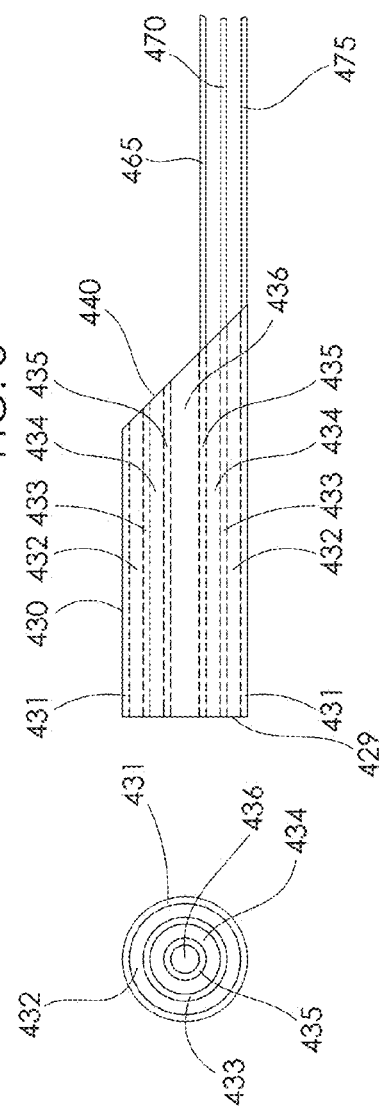

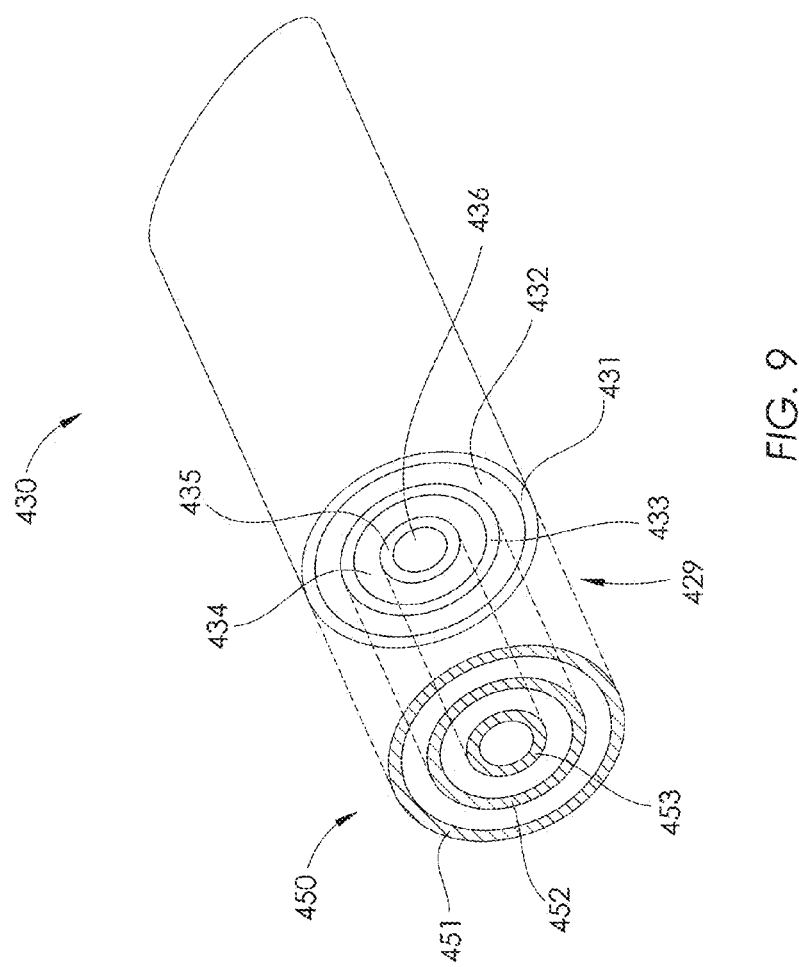

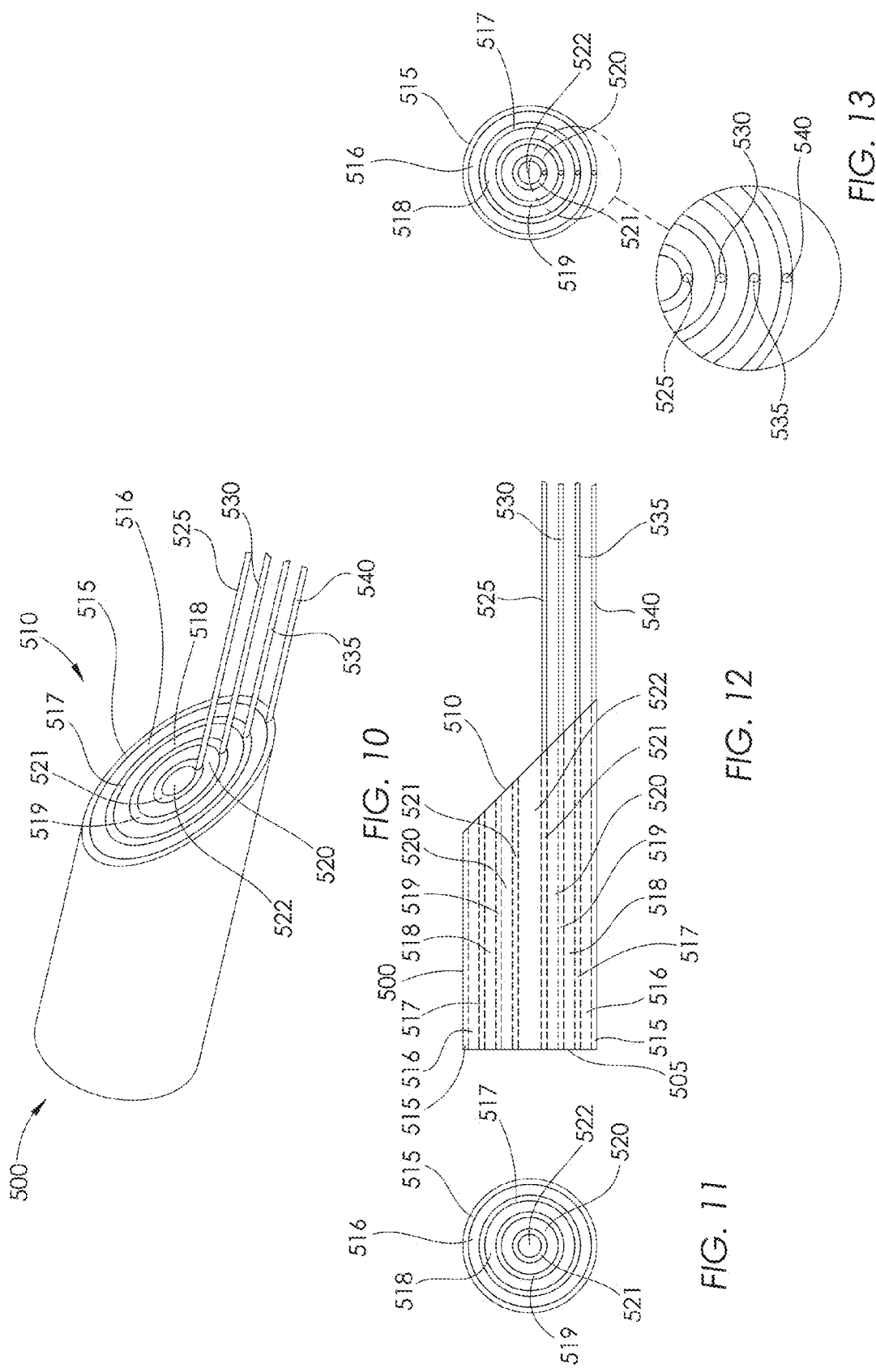

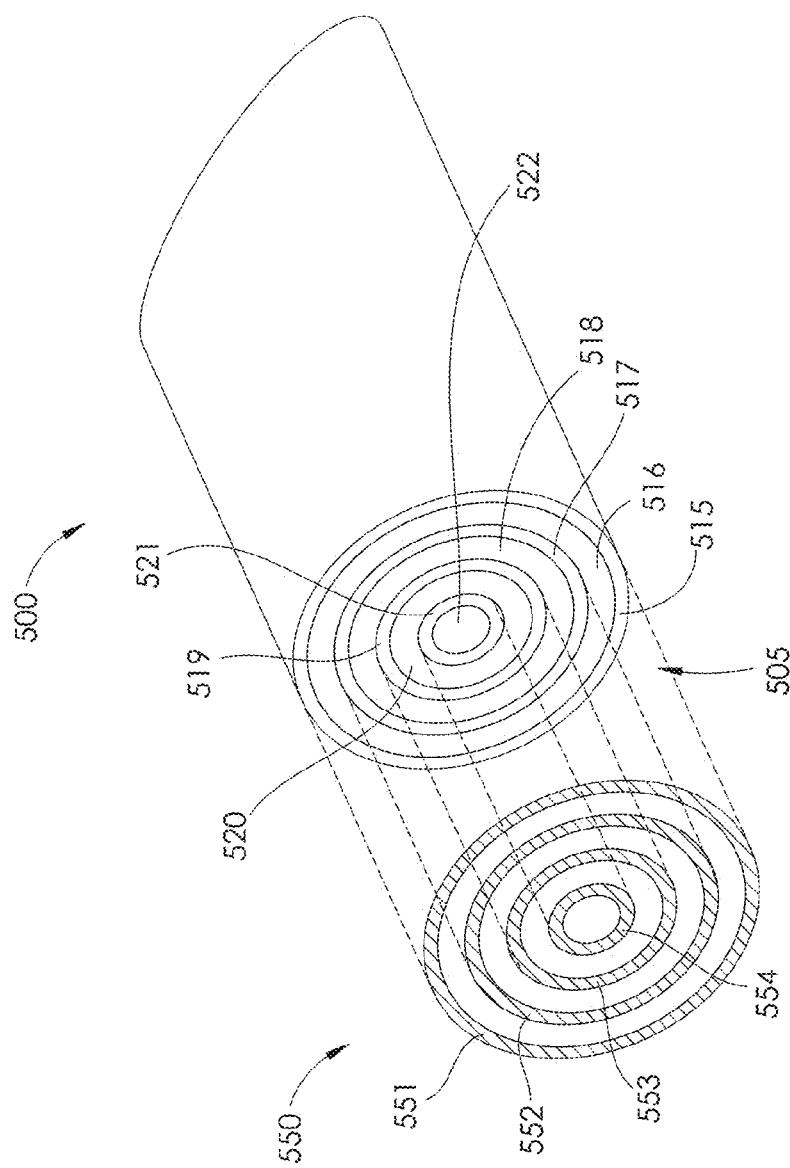

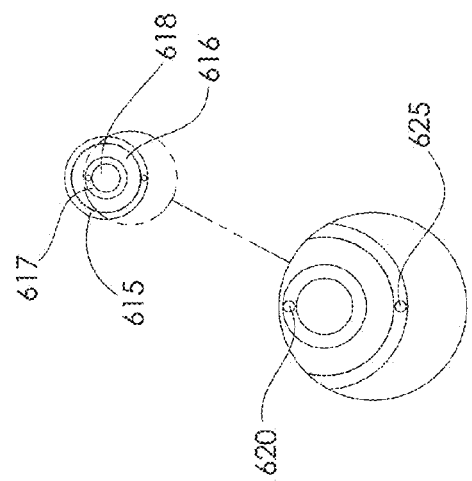
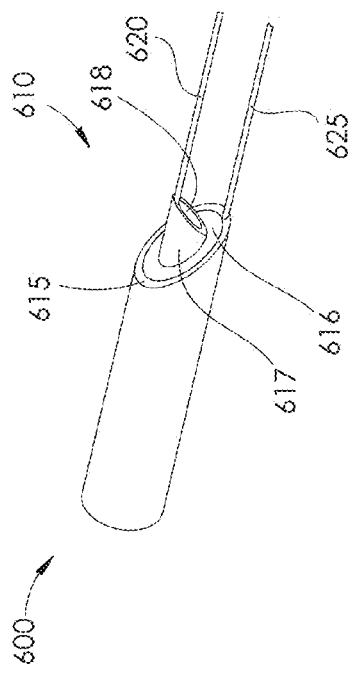
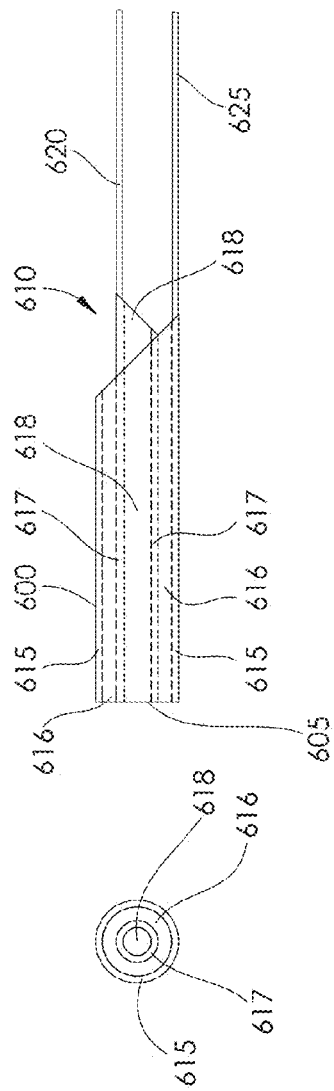

| Meshing | Pout all (dB) | 1st ring (dB) | 2nd ring (dB) | 3rd ring (dB) | 4th ring (dB) |
|---|---|---|---|---|---|
| 1x | -3.94 | N/A | N/A | N/A | N/A |
| 1.5x | -2.53 | N/A | N/A | N/A | N/A |
| 2.5x | -1.39 | -0.44 | -1.22 | -2.12 | -1.89 |

| | Input power (dBm) | Pout (dBm) | Loss (dB) | Output Fiber Loss (dB) | Fresnel Losses (dB) | Loss due to Architecture (dB) |
|---|---|---|---|---|---|---|
| Inner Channel | -2.39 | -35.9 | 33.51 | 5 | 15 | 13.51 |
| Outer Channel | -2.39 | -41.13 | 38.74 | 5 | 15 | 18.74 |
FIG. 30
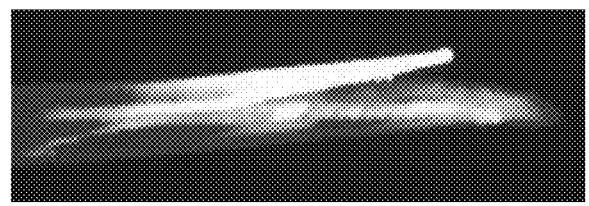
FIG. 31
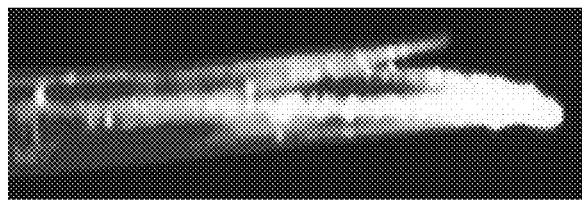
FIG. 32
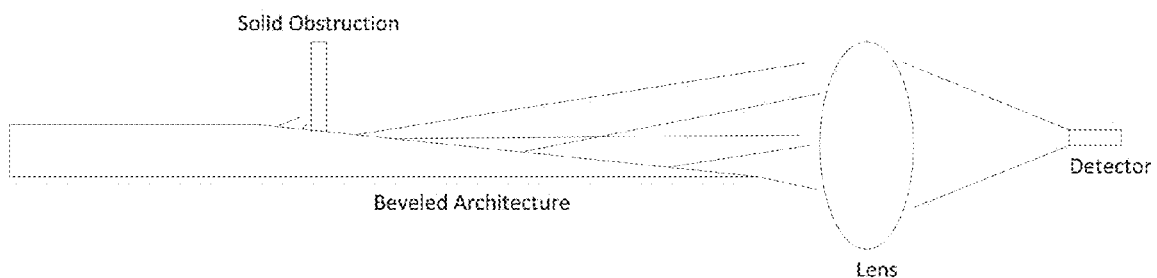
FIG. 33

ALL-OPTICAL SPATIAL DOMAIN MULTIPLEXING DE-MULTIPLEXER

CROSS-REFERENCE TO RELATED APPLICATION

This application claims the benefit of U.S. Provisional Application No. 61/985,751 entitled "All-Optical Spatial Domain Multiplexing De-Multiplexer Architecture" filed Apr. 29, 2014, which is hereby incorporated by reference in its entirety.

FIELD OF INVENTION

The present disclosure generally relates to optical communication systems; more specifically, to an optical-to-optical inline spatial domain multiplexing de-multiplexer.

BACKGROUND

Optical communication systems may use several forms of data or information multiplexing, including frequency-division multiplexing, wavelength-division multiplexing and time-division multiplexing. These various forms of information multiplexing have been explored extensively and are rapidly approaching a point of diminishing returns in terms of bandwidth in optical fibers; however, the demand for increased bandwidth continues to grow. Therefore, new methods of increasing optical fiber capacity are being explored.

Spatial domain multiplexing (SDM) and orbital angular momentum multiplexing (OAM) have been studied for use in increasing the bandwidth of optical fibers. SDM is a multiplexing technique that adds a new degree of photon freedom inside the fiber and allows for a multifold increase in communication bandwidth. SDM allows co-propagation of multiple channels of the same wavelength, allowing spatial reuse of optical frequencies inside a single core. Another version of SDM allows for multiple cores inside of a single cladding, which is akin to laying down more optical fibers, albeit with a better form factor. The growth rate of data usage today requires that more and more fibers be laid down to cope with growing needs.

In short, SDM technology is a multiplexed communication system that allows for transmission of independent data channels inside a single fiber. SDM produces spatially separated co-propagating spatial channels as a function of input angle of each optical channel. Each channel's input angle results in a separate data channel propagating on an independent helical traveling path inside the carrier fiber. The architecture of an exemplary SDM system is shown in FIG. 1. As shown, sources 105 and 110, which may be, for example, pigtail laser sources, launch optical energy (or light) into single mode input fibers 115 and 120. Beam combiner module 125 ensures the relative positioning of input fibers 115 and 120 and multimode carrier fiber 130 so that the optical energy from input fiber 115 and the optical energy from input fiber 120 are launched into carrier fiber 130 at different angles. The range of the input angles of the optical energy into carrier fiber 130 can be as large as allowed by the numerical aperture of carrier fiber 130, with larger angles providing wider helical trajectories inside the fiber. Optical energy from each of sources 105 and 110 traverses the entire length of carrier fiber 130 following separate helical paths. The electric field at the center of these helically propagating waves becomes negligible, due to optical vector vortices allowing for co-propagation of the same wavelength with limited interference or crosstalk. The helically propagated optical energy exits carrier fiber 130 in the form of concentric circular rings which make up SDM intensity profile 135. Each of the rings of SDM intensity profile 135 represent a channel of optical energy. SDM intensity profile 135 is spatially de-multiplexed by beam separator module 140 which may comprise combination of lenses 145. Beam separator module 140 routes the optical energy from the individual channels to photodetectors 150 and 155.

An exemplary SDM intensity profile of a three-channel SDM system is shown in FIG. 2. The exemplary SDM intensity profile comprises three rings, one for each source/channel in the SDM system. The intensity of each source/channel is reflected by the respective ring for that source/channel. The challenge in an all-optical detector design involves capturing photons from the SDM intensity profile output and efficiently guiding them into subsequent fibers or pigtail detectors.

In a typical fiber optic system, the optical energy from a single source/channel that is output from a carrier fiber is read with a PIN diode, which is illustrated in FIG. 3. Incident light 205, from optical fiber 210 is passed to PIN diode 215. Incident light 205 will induce electron-hole pairs in PIN diode 215 causing current to flow relative to the intensity of incident light 205.

A single PIN diode, such as PIN diode 215, does not work well in SDM systems. The incident light from an optical fiber carrying multiple SDM signals would induce only a single current flow in the PIN diode, defeating the purpose of SDM. One method to read each channel of the signal is to use a PIN diode having an octagonal shape. One such design using an array of complementary metal oxide semiconductor (CMOS) photodiodes was described in U.S. Pat. No. 8,278,728 to Murshid, et al. Each region in the array design has a separate p- and n-region. Each of these regions can be connected to separate loads to read each channel of the SDM signal independently.

The CMOS photodiode design de-multiplexes the SDM signal; however, it requires an optical-to-electrical (O/E) conversion. O/E conversions often increase the system complexity and typically limit the bandwidth that can be obtained from a particular signal or channel. This limits the potential usefulness of systems using O/E conversion in communication systems. In addition, use of CMOS photodiode design in current systems requires complete recertification of the system, which is a lengthy and costly process. Therefore, an optical-to-optical solution is needed that will provide for greater bandwidth.

SUMMARY

In accordance with the teachings disclosed herein, embodiments related to an optical-to-optical inline SDM de-multiplexer are disclosed.

In an embodiment, an SDM de-multiplexer comprises a first core, a first cladding layer, a second core and a second cladding layer. The first core has a longitudinal axis and an output end. The output end comprises an angled end face which may be a planar surface disposed at an angle to the longitudinal axis of the first core. The first cladding layer, which has an index lower than the index of the first core, concentrically surrounds the first core. The second core, like the first core, has a longitudinal axis and an output end that comprises an angled end face. The second core also has an axial opening along its longitudinal axis that the first core is positioned within. The second cladding layer, which has an index lower than that of the second core, concentrically surrounds the second core. The longitudinal axis of the first core and longitudinal axis of the second core may be coaxially disposed.

In another embodiment, a system for SDM communication comprises at least one optical source, a SDM optical carrier fiber, a SDM de-multiplexer, two optical output fibers and a photodetector. The at least one optical source is configured to transmit optical energy. The carrier fiber has an input end and an output end and the input end is positioned to couple the optical energy from the at least one optical source. The output end is configured to output a first and a second SDM signal. The SDM de-multiplexer comprises a first core, a first cladding layer, a second core and a second cladding layer. The first core has a longitudinal axis, an input end, and an output end. The input end is positioned to couple the first SDM signal. The output end comprises an angled end face which may be a planar surface disposed at an angle to the longitudinal axis of the first core. The first cladding layer, which has an index lower than the index of the first core, concentrically surrounds the first core. The second core, like the first core, has a longitudinal axis, an input end and an output end that comprises an angled end face. The input end is positioned to couple the second SDM signal. The second core also has an axial opening along its longitudinal axis that the first core is positioned within. The second cladding layer, which has an index lower than that of the second core, concentrically surrounds the second core. The first optical output fiber has an input end and an output end. The input end is positioned to couple the first SDM signal from the first cladding layer at the output end of the first core. The second optical output fiber also has an input end and an output end. The input end is positioned to couple the second SDM signal from the second cladding layer at the output end of the second core. The photodetector is communicatively coupled to the output ends of the first and second optical output fibers and positioned to couple the first and second SDM signals from the first and second optical output fibers.

BRIEF DESCRIPTION OF THE DRAWINGS

FIG. 5 is a front/side perspective view of the concentric core de-multiplexer of FIG. 4 showing coupling of the core/cladding layers to output fibers.

FIG. 6 is a rear elevational view of the concentric core de-multiplexer of FIG. 4.

FIG. 7 is a side elevational view of the concentric core de-multiplexer of FIG. 4.

FIG. 8 is a front elevational view of the concentric core de-multiplexer of FIG. 4 showing coupling of the core/cladding layers to output fibers.

FIG. 9 is a rear/side perspective view of the concentric core de-multiplexer of FIG. 4 showing three rings of an incident SDM intensity profile.

FIG. 10 is a front/side perspective view of a four-channel concentric core SDM de-multiplexer showing coupling of the core/cladding layers to output fibers according to an embodiment of the present invention.

FIG. 11 is a rear elevational view of the concentric core de-multiplexer of FIG. 10.

FIG. 12 is a side view of the concentric core de-multiplexer of FIG. 10 showing coupling of the core/cladding layers to output fibers.

FIG. 13 is a front elevational view of the concentric core de-multiplexer of FIG. 10 showing coupling of the core/cladding layers to output fibers.

FIG. 14 is a rear/side perspective view of the concentric core de-multiplexer of FIG. 10 showing four rings of an incident SDM intensity profile.

FIG. 15 is a front/side perspective view of a two-channel concentric core SDM de-multiplexer showing coupling of the core/cladding layers to output fibers according to an embodiment of the present invention FIG. 16 is a rear elevational view of the concentric core de-multiplexer of FIG. 15.

FIG. 17 is a side view of the concentric core de-multiplexer of FIG. 15 showing coupling of the core/cladding layers to output fibers.

FIG. 18 is a front elevational view of the concentric core de-multiplexer of FIG. 15 showing coupling of the core/cladding layers to output fibers.

FIG. 30 is a chart of the coupled power measured from the experimental setup of the two-channel concentric core de-multiplexer shown in FIG. 29.

FIG. 31 is a photograph of the experimental setup of the two-channel concentric core de-multiplexer shown in FIG. 29 with the inner channel illuminated.

FIG. 32 is a photograph of the experimental setup of the two-channel concentric core de-multiplexer shown in FIG. 29 with the outer channel illuminated.

FIG. 33 is a block diagram of an experimental setup of a bevel architecture of a concentric core de-multiplexer according to an embodiment of the present invention.

DETAIL DESCRIPTION OF THE EMBODIMENTS

A detailed description of the embodiments for an optical-to-optical inline de-multiplexer will now be presented with reference to FIGS. 1-38. One of skill in the art will recognize that these embodiments are not intended to be limitations on the scope, and that modifications are possible without departing from the spirit thereof. In certain instances, well-known methods, procedures, components and circuits have not been described in detail.

Figure 1:
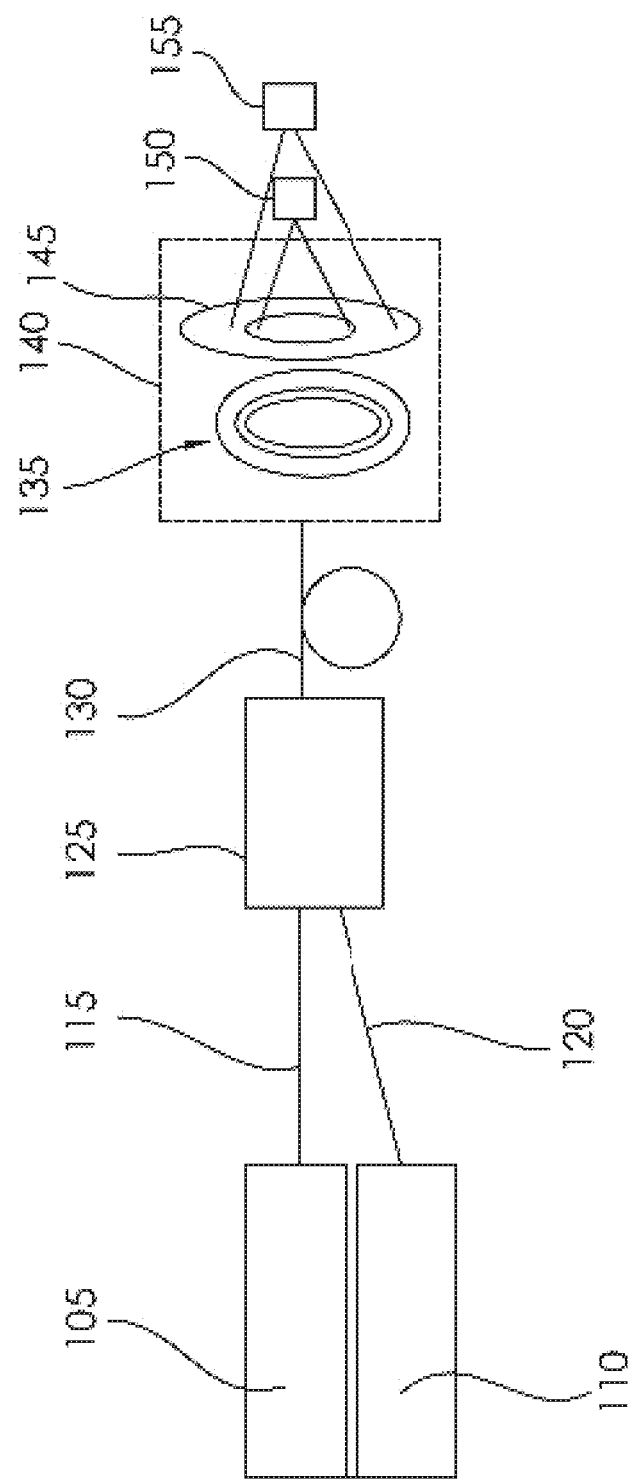
FIG. 1 is a block diagram of an exemplary known SDM system utilizing a beam combiner separator module for de-multiplexing the signal from the carrier fiber.
Figure 2:
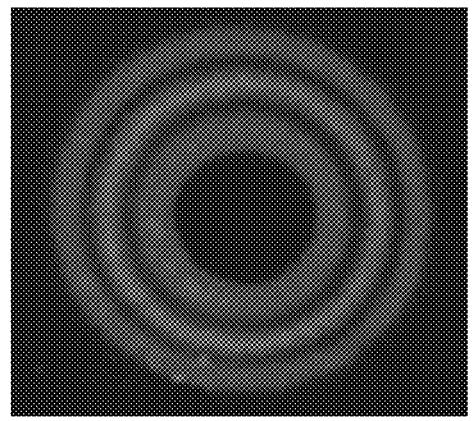
FIG. 2 is an exemplary known output beam profile for a three-channel SDM system.
Figure 3:
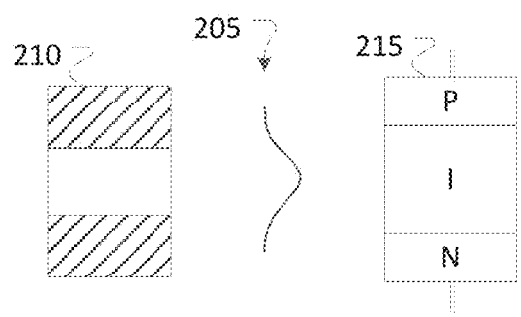
FIG. 3 is a diagram of a typical Gaussian profile from an optical fiber impinging upon a PIN diode to generate photo current.
Figure 4:
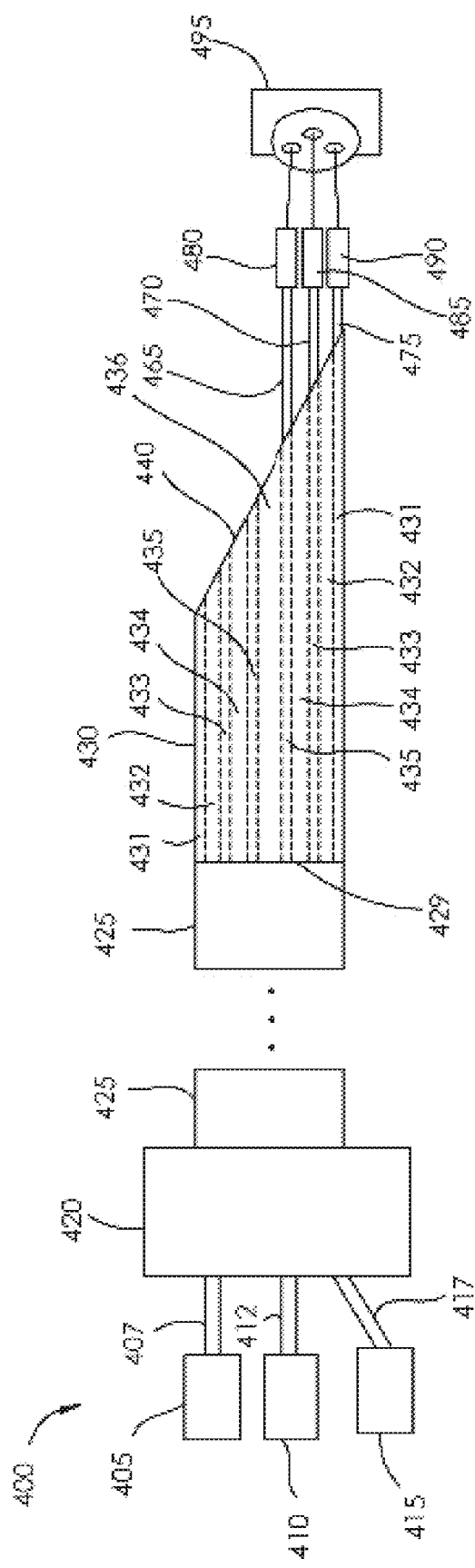
FIG. 4 is a block diagram of an exemplary SDM system utilizing a three-channel concentric core SDM de-multiplexer according to an embodiment of the present invention.

Embodiments of the present invention include an all-optical, concentric core de-multiplexer for an SDM system where multiple channels of optical energy of the same wavelength traverse through a single core inside a carrier optical fiber. Exemplary system 400 is shown in FIG. 4. As shown, sources 405, 410 and 415, which may be, for example, pigtail laser source, launch optical energy (or light) into single mode input fibers 407, 412 and 417, respectively. Beam combiner module 420, which is optional, ensures the relative positioning of input fibers 407, 412 and 417 and multimode carrier fiber 425 so that optical energy from each of input fibers 407, 412 and 417 are launched into carrier fiber 425 at different angles. An exemplary beam combiner module is shown and described in Murshid et al., "CAD Model for Co-Propagating Spatially Multiplexed Channels of Same Wavelength Over Standard Multimode Fibers" Proc. SPIE 7339 Enabling Photonics Technologies for Defense, Security and Aerospace Applications V (2009), which is herein incorporated by reference. Optical energy from each of sources 405, 410 and 415 traverses the entire length of carrier fiber 425 following separate helical paths. The helically propagated optical energy exits carrier fiber 425 in the form of concentric circular rings (similar to that shown in FIG. 2). Each ring represents a channel of helically propagated optical energy, which in this case is also each of sources 405, 410 and 415. The rings are collectively referred to herein as a SDM intensity profile.

SDM de-multiplexer 430 is positioned in-line with carrier fiber 425 such that the SDM intensity profile exiting carrier fiber 425 is incident upon input end 429 of SDM de-multiplexer 430. SDM de-multiplexer 430 can be coupled directly to carrier fiber 425. SDM de-multiplexer 430 is also shown in FIG. 5 (front/side perspective view), 6 (rear view), 7 (side view), 8 (front view) and 9 (rear/side perspective view). SDM de-multiplexer 430 has a longitudinal axis, is cylindrical in shape about the longitudinal axis and has input end 429 and output end 440. Output end 440 comprises an angled end face as best shown in FIGS. 4, 5 and 7. The angled end face may be planar, as shown in FIGS. 4, 5 and 7, or it may be curved. The angled output end is also referred to herein as the bevel. The angle of the angled end face of output end 440 may vary depending on the indexes of the core and cladding. In exemplary embodiments having weakly guided structures, the angle may be an angle greater than the critical angle ($\theta_{critical}$). In exemplary embodiments having highly guided structures, the angle may be between about the equivalent of the index of the core multiplied by the critical angle ($n_{core}*\theta_{critical}$) and two times the critical angle ($2*\theta_{critical}$).

SDM de-multiplexer comprises concentric layers of core and cladding. First core 436, which has a longitudinal axis, is at the center of SDM de-multiplexer 430. First core 436 is concentrically surrounded by first cladding layer 435, which has a lower index of refraction than first core 436. Second core 434 concentrically surrounds first cladding layer 435 and is concentrically surrounded by second cladding layer 433. Similarly, third core 432 concentrically surrounds second cladding layer 433 and is concentrically surrounded by third cladding layer 431. First core 436, second core 434 and third core 432 may have the same index or their indices may be different and first cladding layer 435, second cladding layer 433 and third cladding layer 431 may have the same index or their indices may be different as long as the indices of cladding layers 431, 433 and 435 are lower than the indices of cores 432, 434 and 436. The indexes of the cores and cladding may vary depending on the application. For example for glass-based fibers, the index can range between about 1.925 and about 1.0; however, other types of fibers and glass-based fibers have an index outside of that range can be used with embodiments of the invention. An exemplary cladding that may be used with embodiments of the invention is air; however, any other cladding material having a lower index than the core material can be used. In exemplary embodiments, the cladding index is about 0.01 less than the core index. For example, a core having an index of 1.49 may have a cladding with an index of 1.48. On input end 429 of SDM de-multiplexer 430, the concentric core/cladding layers mimic the rings of the SDM intensity profile 450, which is best shown in FIG. 9. First ring 453 aligns with first core 436 and first cladding layer 435, second ring 452 aligns with second core 434 and second cladding layer 433 and third ring 451 aligns with third core 432 and third cladding layer 431. This allows for coupling of the optical energy of each of rings 451, 452 and 453 of SDM intensity profile 450 to its own core/cladding layer within SDM de-multiplexer 430.

The number of core/cladding layers present in a SDM de-multiplexer depends on the number of channels of the carrier fiber being traversed by helically propagating optical energy. Here, three sources (sources 405, 410 and 415) provide optical energy helically propagating in three channels. Upon exiting carrier fiber 425 the optical energy from each channel creates a ring producing three-ring intensity profile 450. Three-ring intensity profile 450 is incident upon three-channel SDM de-multiplexer 430. If more or fewer channels of optical energy are output from carrier fiber more or fewer core/cladding layers may be needed. As examples, four-channel (four core and four cladding layers) SDM de-multiplexer 500 (FIGS. 10-14) and two-channel (two core and two cladding layers) SDM de-multiplexer 600 (FIGS. 15-19) are described below.

The number of channels propagating through carrier fiber 425 is not necessarily dependent on the number of sources. A single source could launch multiple beams of optical energy that are incident upon carrier fiber 425 at different angles causing propagation of optical energy along multiple channels. SDM de-multiplexer 430 guides and de-multiplexes the optical energy output by carrier fiber 425.

Once the optical energy from rings 451, 452 and 453 of SDM intensity profile 450 have been coupled into the corresponding core/cladding layers (or channels) of SDM multiplexer 430, the optical energy from each of rings 451, 452 and 453 helically propagate along their respective channels. The angled face of output end 440 conforms to total internal reflection and Snell's Law. As the optical energy from each channel enters the angled region of output end 440 of SDM de-multiplexer 430, it is guided and confined and exits SDM de-multiplexer 430 through output fibers 465, 470 and 475, which may have a typical fiber geometry. Output fibers 465, 470 and 475 may be coupled to SDM de-multiplexer 430 using any known coupling mechanism including, for example, fusion splicing or indexed matched epoxy. The optical energy coupled from first ring 453 that traversed through first core 446 and first cladding layer 445 couples into first output fiber 465, the optical energy coupled from second ring 452 that traversed through second core 434 and second cladding layer 433 couples into second output fiber 470 and the optical energy coupled from third ring 451 that traversed through third core 432 and third cladding layer 431 couples into third output fiber 475. Output fibers 465, 470 and 475 may be multimode fibers. Output fibers 465, 470 and 475 may be spliced using fibers splicers 480, 485 and 490 and connected to pigtail detector 495, which can process and analyze the optical energy. Alternatively output fibers 465, 470 and 475 may be coupled to other fibers, to PIN diodes or to one or more photodetectors, including pigtail detectors. The coupling may be achieved using any known coupling mechanism, such as, for example, mechanical or fusion splicing or indexed-matched epoxy.

Four-channel SDM de-multiplexer 500 comprising four core and four cladding layers is shown in FIGS. 10-14. SDM de-multiplexer 500 can be positioned in-line with a carrier fiber (not shown) such that SDM intensity profile 550 (shown in FIG. 14), having rings 551, 552, 553 and 554, is incident upon input end 505 of SDM de-multiplexer 500. SDM de-multiplexer 500 has a longitudinal axis, is cylindrical in shape and has input end 505 and output end 510. Output end 510 comprises an angled end face as best shown in FIGS. 10 and 12. The angled end face may be planar, as shown in FIGS. 10 and 12, or it may be curved. SDM de-multiplexer 500 comprises concentric layers of core and cladding. First core 522, which has a longitudinal axis, is at the center of SDM de-multiplexer 500. First core 522 is concentrically surrounded by first cladding layer 521, which has a lower index of refraction than first core 522. Second core 520 concentrically surrounds first cladding layer 521 and is concentrically surrounded by second cladding layer 519. Similarly, third core 518 concentrically surrounds second cladding layer 519 and is concentrically surrounded by third cladding layer 517 and fourth core 516 concentrically surrounds third cladding layer 517 and is concentrically surrounded by fourth cladding layer 515. First core 522, second core 520, third core 518 and fourth core 516 may have the same index or their indices may be different and first cladding layer 521, second cladding layer 519, third cladding layer 517 and fourth cladding layer 515 may have the same index or their indices may be different as long as the indices of cladding layers 515, 517, 519 and 521 are lower than the indices of cores 516, 518, 520 and 522. On input end 505 of SDM de-multiplexer 500, the concentric core/cladding layers mimic the rings of the SDM intensity profile 550, which is best shown in FIG. 14. First ring 554 aligns with first core 522 and first cladding layer 521, second ring 553 aligns with second core 518 and second cladding layer 517, third ring 552 aligns with third core 520 and third cladding layer 519 and fourth ring 551 aligns with fourth core 516 and fourth cladding layer 515. This allows for coupling of the optical energy of each of rings 551, 552, 553 and 554 of SDM intensity profile 550 to its own core/cladding layer (or channel) within SDM de-multiplexer 500.

Once the optical energy from rings 551, 552, 553 and 554 of SDM intensity profile 550 have been coupled into the corresponding channels of SDM multiplexer 500, the optical energy from each of rings 551, 552, 553 and 554 helically propagates along the respective channels. The angled face of output end 510 conforms to total internal reflection and Snell's Law. As the optical energy from each channel enters the angled region of output end 510 of SDM de-multiplexer 500, it is guided and confined and exits SDM de-multiplexer 500 through output fibers 525, 530, 535 and 540, which may have a typical fiber geometry. Output fibers 525, 530, 535 and 540 may be coupled to SDM de-multiplexer 500 using any known coupling mechanisms including, for example, fusion splicing or indexed matched epoxy. The optical energy coupled from first ring 554 that traversed through first core 522 and first cladding layer 521 couples into first output fiber 525, the optical energy coupled from second ring 553 that traversed through second core 520 and second cladding layer 519 couples into second output fiber 530, the optical energy coupled from third ring 552 that traversed through third core 518 and third cladding layer 517 couples into third output fiber 535 and the optical energy coupled from fourth ring 551 that traversed through fourth core 516 and fourth cladding layer 515 couples into fourth output fiber 540. Output fibers 525, 530, 535 and 540 may be multimode fibers. Output fibers 525, 530, 535 and 540 may be spliced using fibers splicers and connected to a pigtail detector, which can process and analyze the optical energy. Alternatively, output fibers 525, 530, 535 and 540 may be coupled to other fibers, to PIN diodes or to one or more photodetectors, including pigtail detectors. The coupling may be achieved using any known coupling mechanism, such as, for example, mechanical or fusion splicing or indexed-matched epoxy.

Two-channel SDM de-multiplexer 600 comprising two core and two cladding layers is shown in FIGS. 15-19. SDM de-multiplexer 600 can be positioned in-line with a carrier fiber (not shown) such that SDM intensity profile 650 (shown in FIG. 19) having rings 651 and 652, is incident upon input end 605 of SDM de-multiplexer 600. SDM de-multiplexer 600 has a longitudinal axis, is cylindrical in shape and has input end 605 and output end 610. Output end 610 comprises a dual angled end face as best shown in FIGS. 15 and 17. The angled end faces may be planar as shown in FIGS. 15 and 17 or may be curved.

Figure 19:
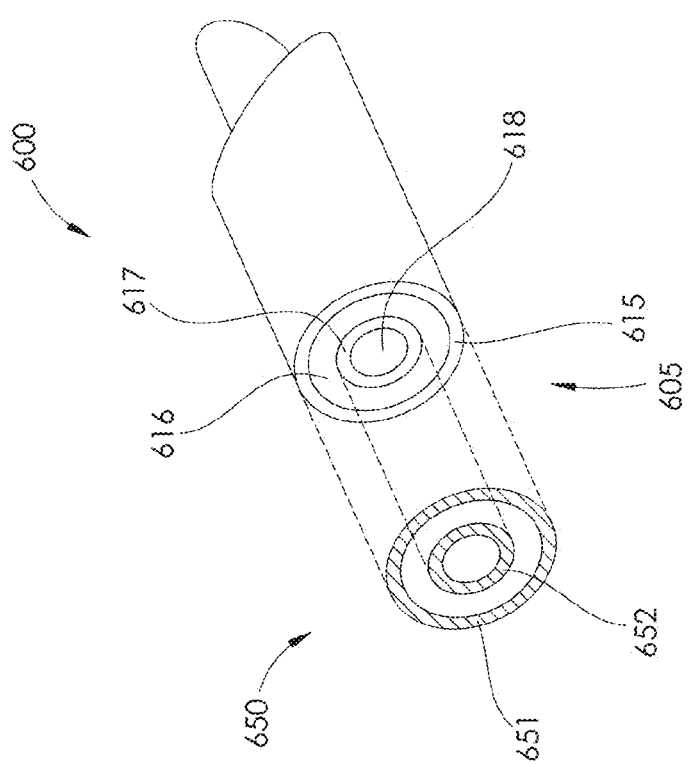
FIG. 19 is a rear/side perspective view of the concentric core de-multiplexer of FIG. 15 showing two rings of an incident SDM intensity profile.

SDM de-multiplexer 600 comprises concentric layers of core and cladding. First core 618, which has a longitudinal axis, is at the center of SDM de-multiplexer 600. First core 618 is concentrically surrounded by first cladding layer 617, which has a lower index of refraction than first core 618. Second core 616 concentrically surrounds first cladding layer 617 and is concentrically surrounded by second cladding layer 615. First core 618 and second core 616 may have the same index or their indices may be different and first cladding layer 617 and second cladding layer 615 may have the same index or their indices may be different as long as the indices of cladding layers 615 and 617 are lower than the indices of cores 616 and 618. On input end 605 of SDM de-multiplexer 600, the concentric core/cladding layers mimic the rings of the SDM intensity profile 650, which is best shown in FIG. 19. First ring 652 aligns with first core 618 and first cladding layer 617 and second ring 651 aligns with second core 616 and second cladding layer 615. This allows for coupling of the optical energy of each of rings 651 and 652 of SDM intensity profile 650 to its own core/cladding layer (or channel) within SDM de-multiplexer 600.

Once the optical energy from rings 651 and 652 of SDM intensity profile 650 have been coupled into the corresponding channels of SDM multiplexer 600, the optical energy from each of rings 651 and 652 helically propagates along the respective channels. The dual angled face of output end 610 conforms to total internal reflection and Snell's Law. As the optical energy from each channel enters the angled regions of output end 610 of SDM de-multiplexer 600, it is guided and confined and exits SDM de-multiplexer 600 through output fibers 620 and 625, which may have a typical fiber geometry. Output fibers 620 and 625 may be coupled to SDM de-multiplexer 600 using any known coupling mechanism including, for example, fusion splicing or indexed matched epoxy. The optical energy coupled from first ring 652 that traversed through first core 618 and first cladding layer 617 couples into first output fiber 620 and the optical energy coupled from second ring 651 that traversed through second core 616 and second cladding layer 615 couples into second output fiber 625. Output fibers 620 and 625 may be multimode fibers. Output fibers 620 and 625 may be spliced using fibers splicers and connected to a pigtail detector, which can process and analyze the optical energy. Alternatively, output fibers 620 and 625 may be coupled to other fibers, to PIN diodes or to one or more photodetectors, including pigtail detectors. The coupling may be achieved using any known coupling mechanism, such as, for example, mechanical or fusion splicing or indexed-matched epoxy.

Exemplary simulations of three-channel and four-channel concentric core de-multiplexer, exemplary experimental designs of a two-channel concentric core de-multiplexer and a bevel architecture are described below. All four are exemplary and should not be taken to limit the scope of the invention.

Exemplary Simulation: Three-Channel Concentric Core De-Multiplexer

Figure 20:
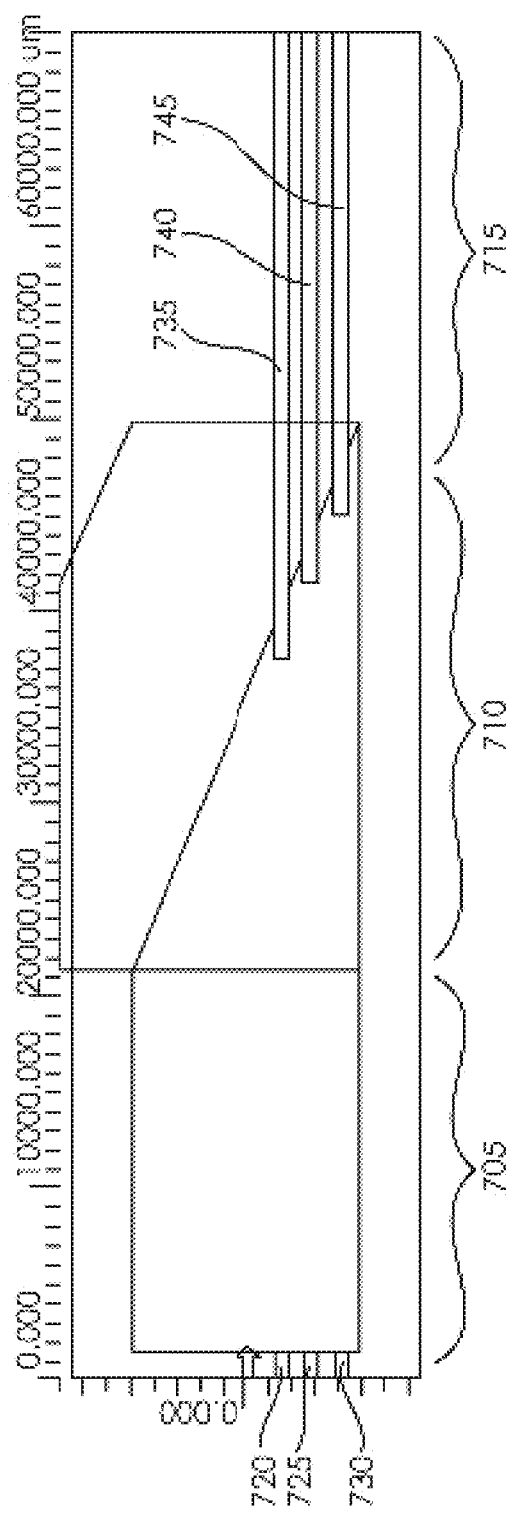
FIG. 20 is diagram produced by OptiBPM™ of a simulation of a three-channel concentric core de-multiplexer according to an embodiment of the present invention.

OptiBPM™ is a commercially available fiber optic simulation engine that is commonly used for beam propagation modeling in optical fiber systems. As illustrated in FIG. 20, OptiBPM™ was used to simulate the architecture of an exemplary embodiment of a three-channel concentric core SDM de-multiplexer by employing two index values—the core index, $n_1$=1.5 and the free space index, $n_2$=1.0. The core index is given to each of the three core rings to mimic silica fiber waveguides. The fibers modeled were all contained in a one meter space. This space contains three key regions: ring formation region 705, which generates the rings of a SDM intensity profile, bevel region 710, which guides each of the rings into a single fiber and output fiber region 715, which couples optical energy from the SDM channels of bevel region 710 into output fibers 735, 740 and 745.

Ring formation region 705, which receives optical energy from input fibers 720, 725 and 730, excites helical propagation inside the fiber to establish co-propagating SDM channels of optical energy in the fiber. In this simulation, ring formation region is 10 cm in length. Bevel region 710 is 40 cm from the beginning of the bevel to its end. A strip of free space is placed over bevel region 710. Since the surrounding region of the fiber is free space, the strip will blend well with free space and simulate the beveled edge. Output fiber region 715 spans 50 centimeters in this simulation and comprises output fibers 735, 740 and 745.

Figure 21:
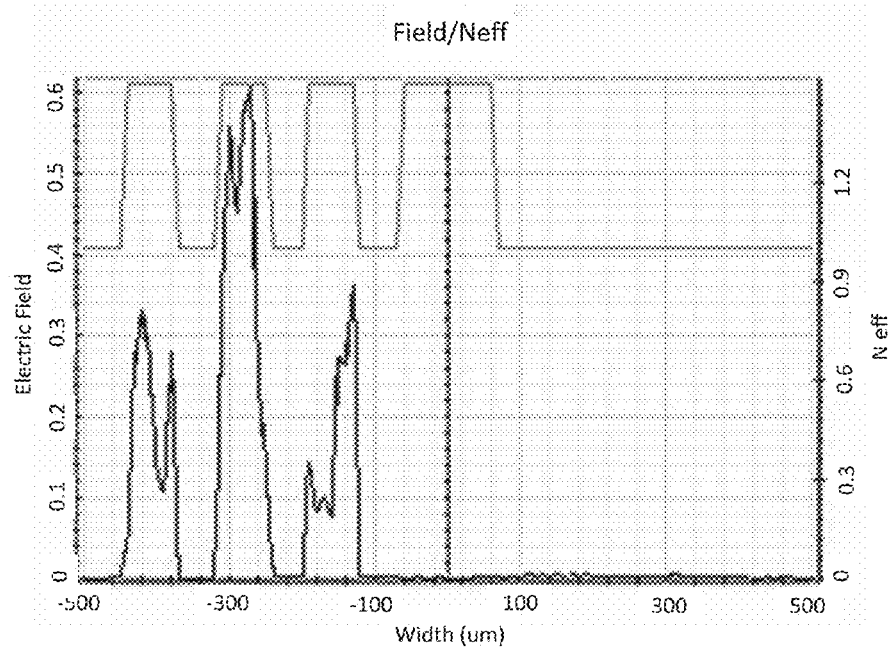
FIG. 21 is a graph of the normalized electric field intensities confined within the core regions of the three output fibers in the OptiBPM™ simulation of FIG. 20.
Figure 22:
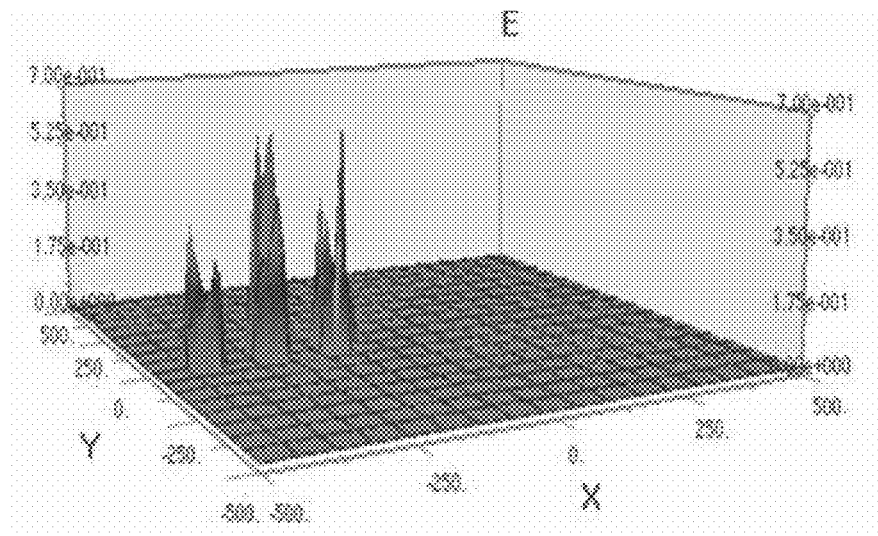
FIG. 22 is a three-dimensional graph of the electric fields inside the three output fibers in the OptiBPM™ simulation of FIG. 20.

Three simulated signals, each with a normalized power of 0 dB, were coupled into an array of concentric core fibers. Transmission from ring formation region 705 to bevel region 710 was nearly lossless and at the beginning of the fiber bevel, the intensity of the signal was close to the original strength. The signal underwent attenuation while traversing through bevel region 710 and by the time the signals reached output fibers 735, 740 and 745, the total loss in the system was approximately 3.8 dB. By the end of the meter long simulation region, the loss was approximately 7.0 dB. The results from output fibers 735, 740 and 745 are shown in FIGS. 21 and 22. FIG. 21 shows the normalized electric field within the core region of, from left to right, output fibers 745, 740 and 735. The signal at the beginning of a given channel have a normalized value of 1, or 0 dB. This leaves a loss in each channel, respective to FIG. 21, of 9.8 dB, 4.4 dB, and 4.3 dB. FIG. 22 shows a three-dimensional representation of the electric fields inside, from left to right, output fibers 745, 740 and 735.

Figure 23:
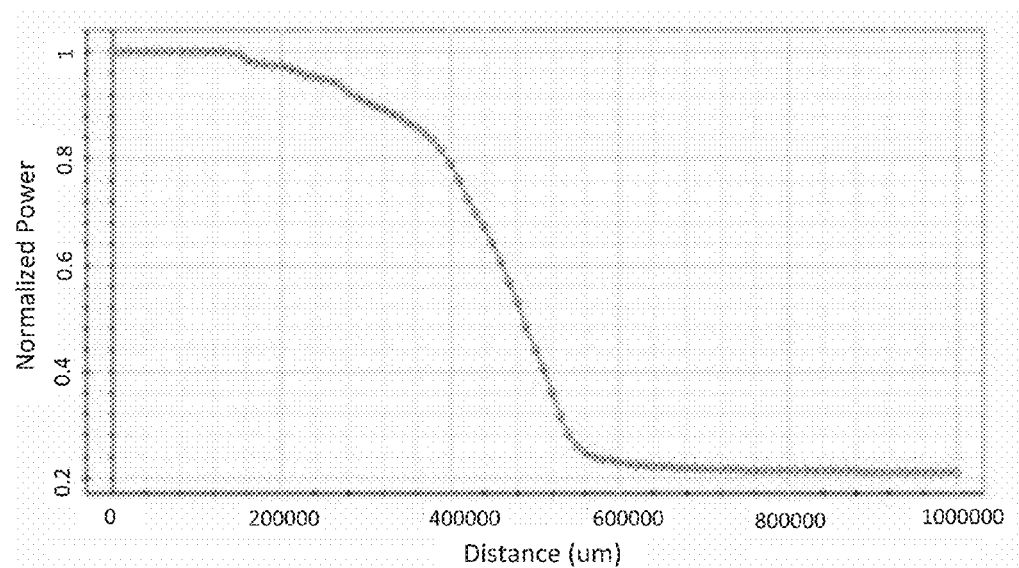
FIG. 23 is a graph showing the normalized power as a function of distance of the OptiBPM™ simulation shown in FIG. 20.

OptiBPM™ provides for analysis of power in the system as function of system length. It normalizes the power to the total input at the start of the system. The total normalized power in the system as a function of distance (in micrometers) is shown in FIG. 23. Although bevel region 710 provides better coupling efficiencies, the signal undergoes losses. However, these losses can be attributed to the way the OptiBPM™ simulation engine handles curved surfaces.

A series of exemplary simulations were run for each channel individually to analyze cross talk between each output channel. The results show an average cross talk of approximately −14 dB, with a variance of 3 dB. These values can be improved by at least another 3 dB by tweaking different model parameters including decreasing the slope of the bevel region, changing the indices of refraction and increasing the mesh density. The SDM can also be conditioned prior to coupling into the SDM de-multiplexer. It should also be noted that OptiBPM™ is not optimized for helical propagation of light inside optical fibers.

Exemplary Simulation: Four-Channel Concentric Core De-Multiplexer

Figure 24:
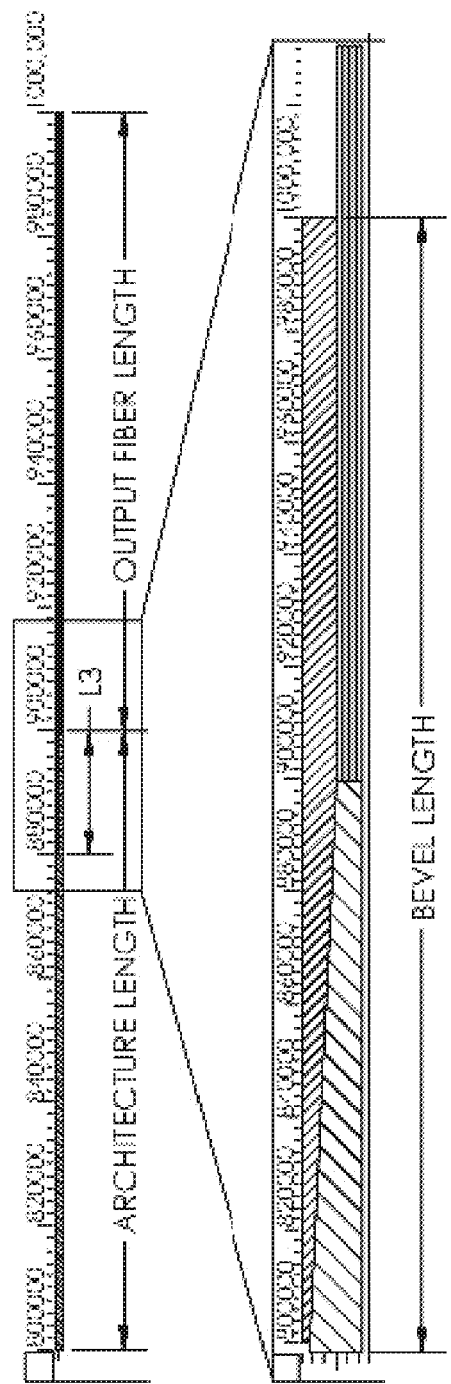
FIG. 24 is diagram produced by OptiBPM™ of a simulation of a four-channel concentric core de-multiplexer according to an embodiment of the present invention.

As illustrated in FIG. 24, OptiBPM™ was used to simulate the architecture of an exemplary embodiment of a four-channel concentric core SDM de-multiplexer. A core index of 1.5 and a cladding index of 1.48 were used. The de-multiplexer architecture had a diameter of 1 mm while the four output fibers were 62.5 um in diameter. The total length of the testing region, including output fibers is 2 meters. The length of the de-multiplexer architecture was 1 m.

Figures 25, 26:
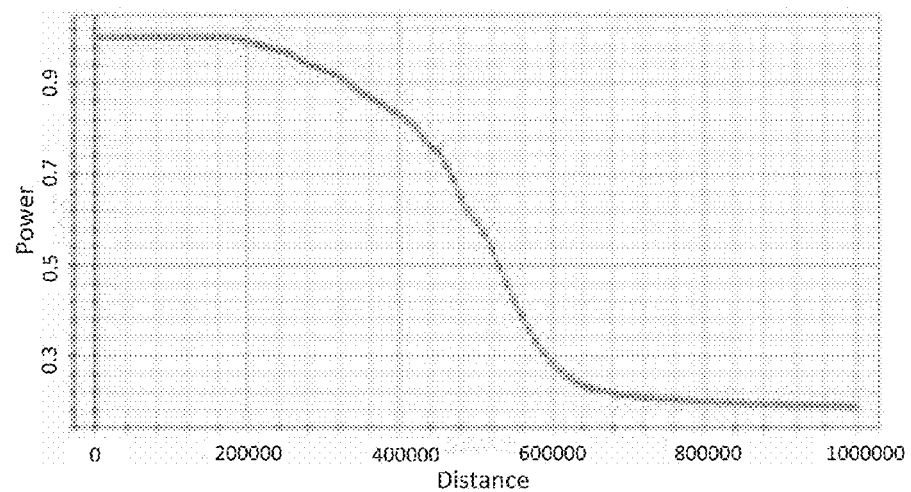
FIG. 25 is a graph of the power as a function of distance of the simulated system shown in FIG. 24.
FIG. 26 is a chart of the OptiBPM™ test results of the overall coupling rate output of the simulated system shown in FIG. 24.

The total power in the system as a function of distance as provided by OptiBPM is shown in FIG. 25. A total length of 2 meters was used to allow any lost power (i.e. noise) to escape the system in order to minimize its effect on the results.

A number of tests were performed on the simulated de-multiplexor architecture. The first series tested the overall coupling rate, in decibels, that is expected be output from the de-multiplexor. Results of the test are shown in FIG. 26, where the first ring is the inner most channel of the de-multiplexer (including both the inner most core and its surrounding cladding) and the fourth ring is the outermost channel (including the outermost core and its surrounding cladding). For these tests, a bevel length of 0.9 meters was used. Several mesh densities were tested. Meshings up to 2.5 times the default were used which resulted in a minimal power loss of 1.39 dB across the entire architecture. Tests were also run to determine the loss in each ring of the SDM output channels. The test results showed that the outer channels experienced more loss than the inner channels.

Figure 27:
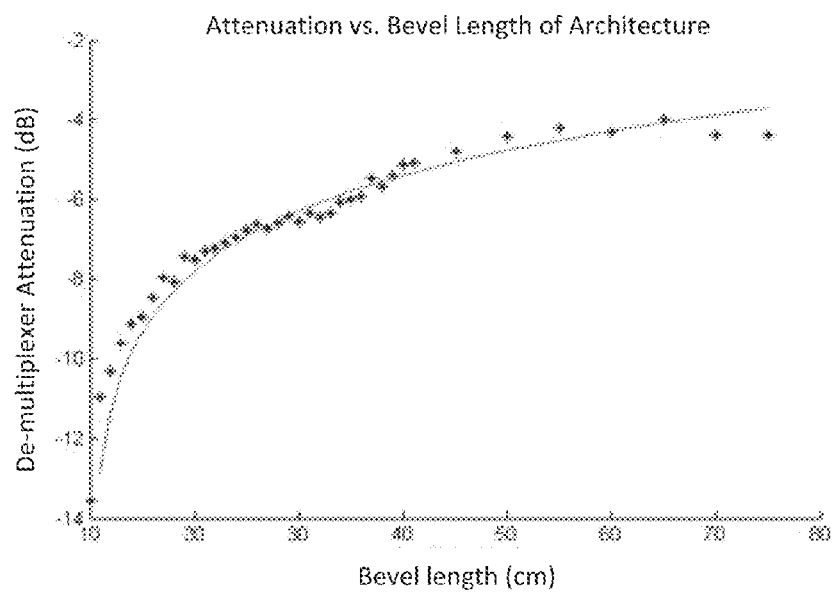
FIG. 27 is a graph of the attenuation of the simulated de-multiplexer shown in FIG. 24 as the de-multiplexer's bevel length (or length of a portion of the output end that is angled) is varied.

The next series of tests determined changes in bevel length affects the coupled power of the structure. These test used standard 1× meshing. The bevel length was varied from 0 cm to 75 cm and the results are shown in FIG. 27. The trend line in FIG. 27 is characterized by the following equation:

$$\text{Power(dB)} = 2.2 * \ln(x-10) - 12.881$$

As can be seen in FIG. 27, in this exemplary simulation a larger bevel returns a better coupled power; however, a larger bevel also requires a much larger structure to accommodate the bevel size.

Exemplary Experimental Design: Two-Channel Concentric Core De-Multiplexer

Figure 28:
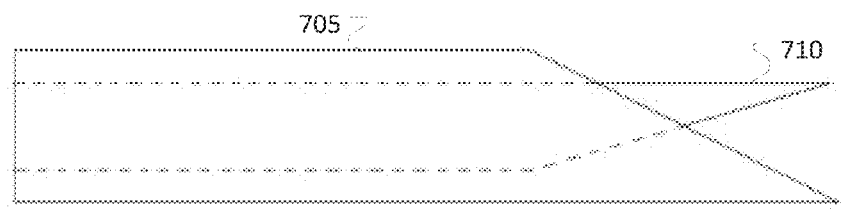
FIG. 28 is a side elevation view of the experimental setup of a two-channel concentric core de-multiplexer according to an embodiment of the present invention.
Figure 29:
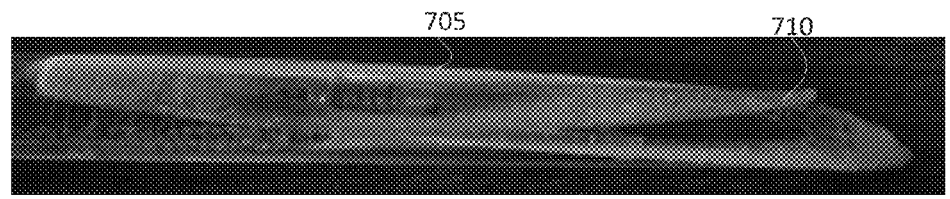
FIG. 29 is a photograph of the experimental setup of a two-channel concentric core de-multiplexer according to an embodiment of the present invention.

As shown in FIGS. 28 and 29, two acrylic rods—outer rod 705 and inner rod 710—were used to simulate a two-channel concentric core de-multiplexer and air was used as the cladding. Both outer rod 705 and inner rod 710 were 12 inches long. Outer rod 705 had an opening along its longitudinal axis that inner rod 710, which was solid, was positioned within. The outer radius of outer rod 705 was 0.5 inches and the inner radius of outer rod 705 was 0.25 inches. The bevel length was approximately 4 inches. Inner rod 710 was rotated about 180 degrees to allow for ease in testing the design.

For testing, the two-channel de-multiplexer was mounted in front of a laser source and the source was launched directly into the structure. A 1 mm plastic fiber, acting as an output fiber, was placed at the output of the de-multiplexer to gather the coupled light and pass it to a photodetector. The test was performed on one channel at a time in order to determine crosstalk with the alternative channel. The input fiber launched −2.39 dBm of power into the channels. The output fiber was measured to have a loss of approximately 5 dB. The results of the test are shown in FIG. 30. FIG. 31 shows inner rod 710 illuminated during testing and FIG. 32 shows outer rod 705 illuminated during testing.

The losses experienced by the inner and outer channels were 33.51 dB and 38.74 dB, respectively; however much of the loss can be accounted for by sources other than the de-multiplexer architecture. The output fiber had a loss of 5 dB. There was also a significant number of breaks in the acrylic rods since the bevel was created using a band saw. The breaks account for approximately 12 dB of loss of the inner channel and 15 dB of loss for the outer channel. Therefore, the actual loss of the inner and outer channels are about 16.51 dB and 18.74 dB, respectively.

Figure 34:
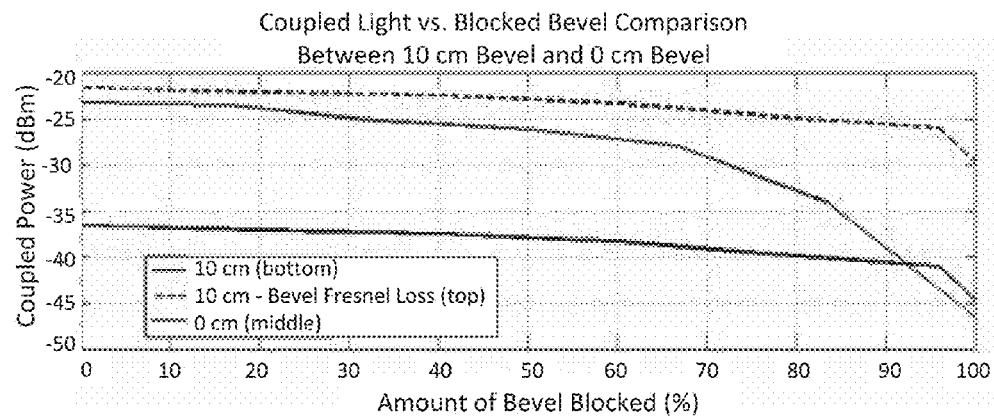
FIG. 34 is a graph comparing the coupled power verses the amount of bevel blocked between a 0 cm bevel and a 10 cm bevel using the experimental setup shown in FIG. 33.

The effectiveness of the bevel was also tested. A diagram of the testing setup is shown in FIG. 33. A laser source was used to launch light into the outer channel of the two-channel de-multiplexer. Instead of coupling the light into the plastic fiber as was done above, a lens was placed in front of the de-multiplexer. The lens will focus all light from the de-multiplexer instead of a single point at the end. An obstruction, is then moved along the bevel and the amount of light at particular points along the bevel were recorded. Two different bevel lengths were used in the test—10 cm and 0 cm. The results of the test are shown in FIG. 34. As shown in FIG. 34, the 10 cm bevel guides the light much better than the 0 cm bevel. This is indicated by the slopes of the lines on the curve. For the 0 cm bevel, there is a progressive growth in the slope of the curve as it approaches 100% blocked; however, with the 10 cm bevel, the slope is very narrow and does not grow until the very end of the curve, which indicated the structure is completely blocked.

Exemplary Simulation: Bevel Architecture

Figure 35:
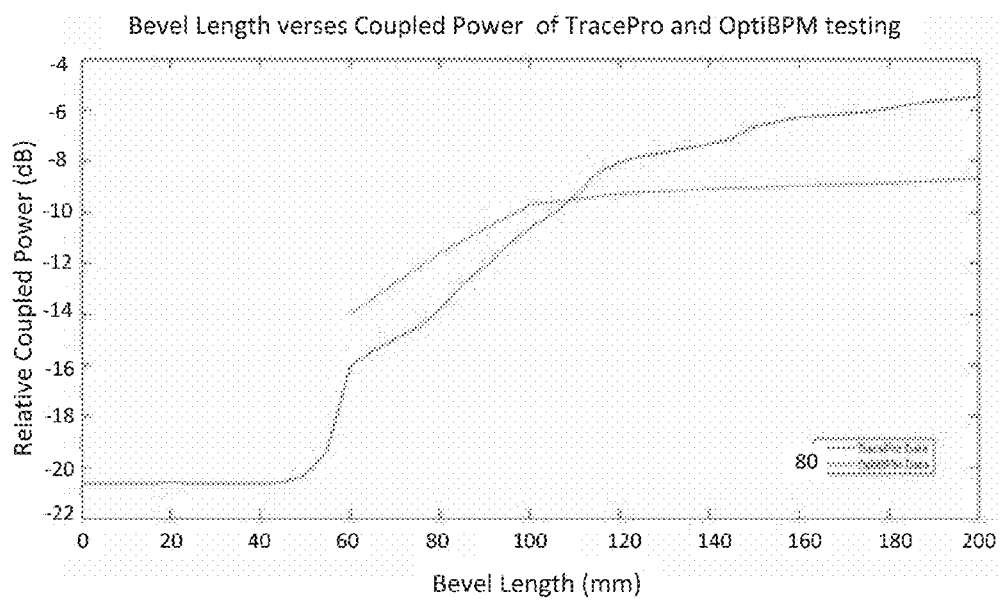
FIG. 35 is a graph comparing TracePro™ and OptiBPM™ results of the coupled power verses the bevel length of an exemplary simulated bevel architecture according to an embodiment of the present invention.

TracePro™ is a program used generate simulations of optical structures and utilize ray tracing algorithm to test the simulations. TracePro™ was used to generate a beveled single channel to test channel guidance for various length of bevels. The output fiber of the simulated design had a diameter of 1 mm. The bevel length was varied from 0 mm to 200 mm and the non-beveled portion of the channel (i.e. the ring formation region) had an outer radius of 12.7 mm radius with inner radius of 6.35 mm. Acrylic was used for the simulation having an index of roughly 1.49 and the input wavelength of 1550 nm was used. The results are shown in FIG. 35.

The results show a similar result to those found by the OptiBPM™ results in FIG. 27. There is a clear logarithmic response in both graphs which starts at a defined point. For the TracePro™ results, this is roughly equal to a bevel angle of 66 degrees. Originally, it was theorized that the bevel's angle would start guiding at a value roughly equivalent to the critical angle; however, assuming an index of 1.49 for acrylic, this would be 42.2 degrees.

Figure 36:
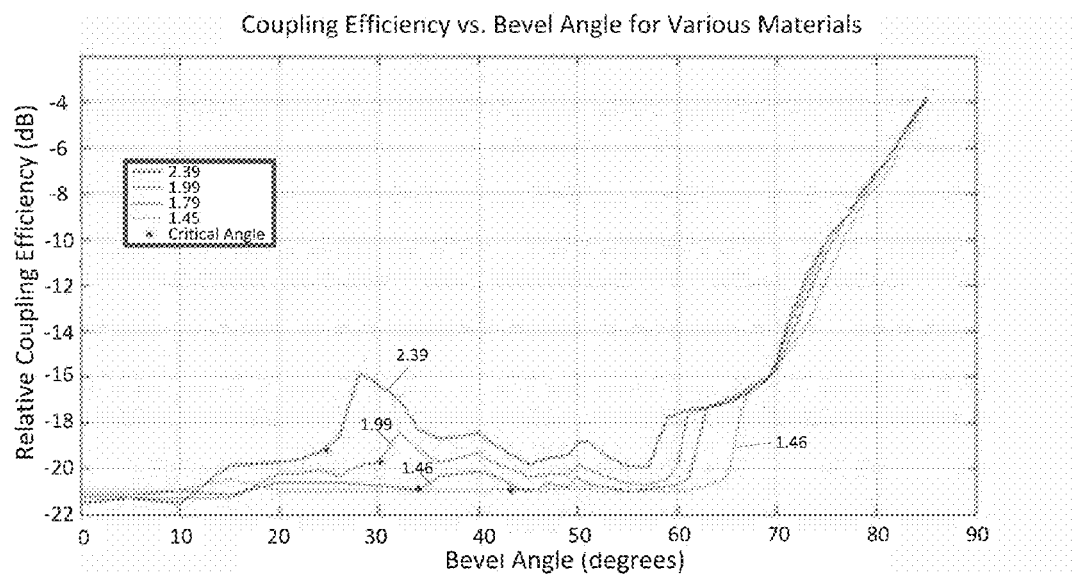
FIG. 36 is a graph comparing the coupling efficiency verses bevel angle for four different index values of an exemplary simulated bevel architecture according to an embodiment of the present invention.
Figure 37:
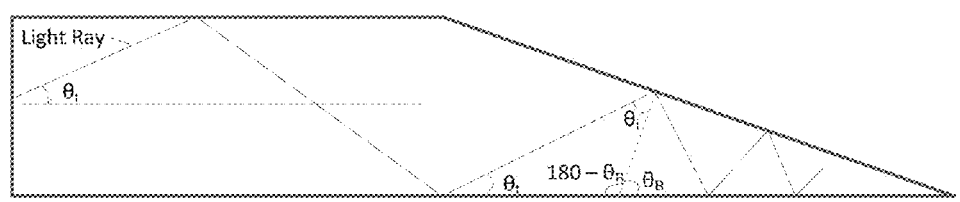
FIG. 37 is a block diagram of a bevel architecture according to an embodiment of the present invention.

Tests were run to determine if there was a relationship between bevel length and critical angle. These tests varied the angle of the bevel, as opposed to the length of the bevel and varied the index of the bevel architecture. The angles were varied from 0 to 85 degrees and with four different materials. The index values for the materials were 2.39, 1.99, 1.79 and 1.46. The results are shown in FIG. 36. As shown, for higher index materials, there is a small spike in received power starting at the critical angles. This spike appears to die out rather quickly, but for the 2.39 index, this spike eclipses the power coupled for some higher angles, meaning higher index materials could utilize much smaller bevels. Also, at roughly 60 degrees for each of the materials there is a large increase in coupled power before it begins to grow exponentially as the angles are further increased. After comparing these values to the critical angle, a relationship was found between the two. This relation is given by Equation 1.

$$\theta_g = n_1 \sin^{-1} \frac{1}{n_1} = n_1 * \theta_C, \quad \text{(Equation 1)}$$

where $\theta_g$ is the desired angle of growth, $n_1$ is the index of refraction of the bevel, and $\theta_c$ is the critical angle. From this point, the coupled power grows exponentially as the angle is further increased.

The next step in the process was a theoretical analysis of the bevel to find the angle for which all light is coupled along the beveled edge. One might assume that if the bevel was equivalent to the critical angle, it would guide all the incoming channels without losses; however, this only occurs if all light is traveling parallel to the fiber's edges. According to the acceptance angle formula, if the numerical aperture is greater than 1, all light incident into the core of a fiber will be coupled. This means that the incident angle of the incoming light can go upwards of 90 degrees. Using Snell's law, the transmitted angle is equivalent to the critical angle. Using the theoretical diagram of FIG. 37, an equation can be formed to find a preferred bevel angle.

For the general setup, there are three critical terms: the transmission angle into the fiber, $\theta_t$, the incident angle, $\theta_i$, and the bevel angle, $\theta_B$. The incident angle is the angle of the first bounce on the beveled edge. In order for the beam to be properly guided, this angle must be greater than the critical angle. The term $180-\theta_B$ follows from the small corner of the bevel being equal to $90-\theta_B$. By utilizing these three terms, Equation 2 is determined:

$$\theta_i = 180 - (180-\theta_B+\theta_t) = \theta_B - \theta_t \quad \text{(Equation 2)}$$

From this, the condition that the incident angle must be greater than the critical angle can be applied to find Equation 3.

$$\theta_c \leq \theta_i \therefore \theta_B \geq \theta_C + \theta_t \quad \text{(Equation 3)}$$

This means that in order for the ray to apply total internal reflection for the first reflection, the bevel angle must be greater than critical angle plus the transmission angle. This gives an absolute minimal value for proper coupling of the incident light.

From here, there are two situations to consider, a weakly guiding fiber and a strongly guiding fiber. A weakly guiding approximation occurs when the difference between core and cladding is roughly equivalent to 1% or lower, $\Delta \leq 0.01$ according to Equation 4. An example of such an approach for simulations is seen in the OptiBPM™ results of FIG. 27.

$$\Delta \cong \frac{n_1 - n_2}{n_1} \quad \text{(Equation 4)}$$

For a strongly guiding approximation, the $\Delta$ value is typically very large, much larger than 1%. This is the approach taken in many of the results above, such as the two-channel experimental setup and the TracePro™ simulation results.

For a weakly guiding approximation, the critical angle is typically very large. This means that less light will be coupled into the fiber as the acceptance angle is proportionally small in comparison. For a strongly guiding approximation, the critical angle is much smaller, less than 45 degrees or $\pi/2$ radians. As a result, the acceptance angle is very large. For the results presented, the acceptance angle is typically equivalent to just below 90 degrees, meaning any ray incident on the core material will be captured.

Applying these two conditions to Snell's Law, the value of the transmission angle can be determined. The first step is to define a specific bound between the two approaches of weakly guiding and strongly guiding. Utilizing the acceptance angle equation, when numerical aperture is larger than 1, the acceptance angle becomes undefined. This is taken to mean that any angle of light will be coupled. When numerical aperture is less than 1, a weakly guiding scenario takes place. The maximum transmission angle value for both scenarios can be seen in the piecewise function in Equation 5

$$\theta_t = \begin{cases} 90 - \theta_C, & NA < 1 \\ \theta_C, & NA \geq 1 \end{cases} \quad \text{(Equation 5)}$$

Using this, the largest possible ray angles, the values obtained in Equation 5 can then be utilized to determine the conditions that must be applied in order to guide the maximum amount of light through the bevel. These conditions can be seen in Equation 6 after applying Equation 5 to Equation 3.

Strongly Guiding Approximation, $\theta_B \geq 2\theta_C$ $\theta_C < 45°$

Weakly Guiding Approximation, $\theta_B \geq 90°$ $$\theta_C \geq 45° \quad \text{(Equation 6)}$$

From this equation, a bevel angle is derived to be at least twice the critical angle for a strongly guiding approach and it must be equivalent or greater than 90 degrees for a weakly guiding approach. In the strongly guiding approach, a definite limit on the required bevel size is defined; however, in the weakly guiding approach, the limit on the bevel angle is a physical impossibility. These two limits are each depicted in the results from OptiBPM™, FIG. 27, and TracePro, FIG. 35. In FIG. 27, the length is approaching angles of 89-89.2 degrees before the coupled power begins to taper off. In FIG. 35, the coupled power starts tapering off as it approaches the $2\theta_C$ point.

Utilizing these limits on the bevel angle, the total length of the bevel architecture can be determined using the following geometric relationship:

$$a * \tan\theta_B = x, \quad \text{(Equation 7)}$$

where a is the diameter of the architecture and x is the length of the bevel. Given that the incident angle must be larger than the Brewster angle in order for total reflection to occur, which is represented by $$\theta_i > \sin^{-1}\frac{n_2}{n_1},$$

where $n_1$ is the index of refraction for a core material, and $n_2$ is the index of refraction for a cladding material, by using Equation 3, Equation 8 can be derived for the strongly guided approximation.

$$a * \tan\left(2 * \sin^{-1}\frac{1}{n_1}\right) = x \quad \text{(Equation 8)}$$

Figure 38:
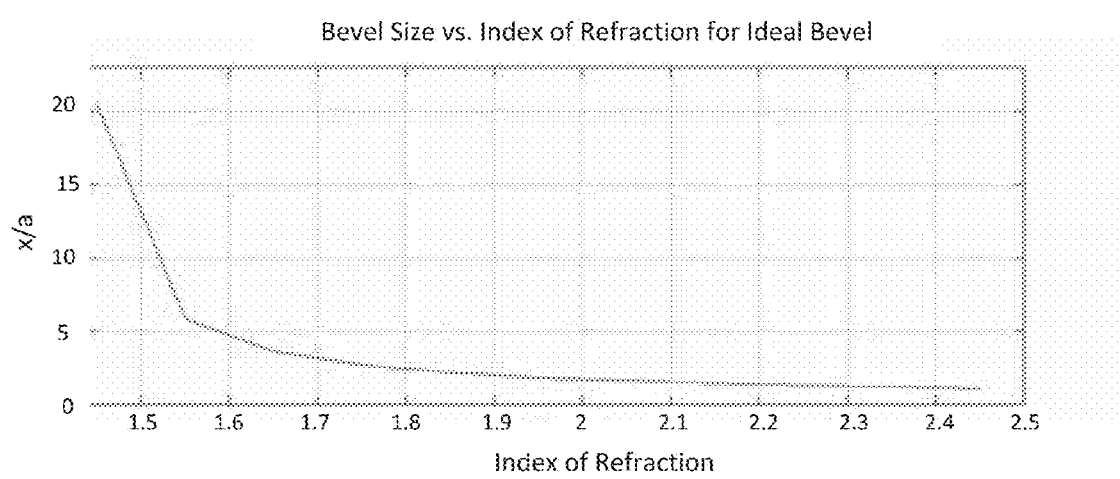
FIG. 38 is a graph of the bevel size verses the index of fraction assuming a minimal bevel angle for a bevel architecture according to an embodiment of the present invention.

A plot of this equation, relating x/a verses $n_1$, can be seen in FIG. 38. Exemplary architecture length for a standard 62.5/125 multimode fiber architecture may be between about 0.5 mm and 3.5 mm depending on whether a weakly guided or a strongly guided design is being used.

In an alternative embodiment, the multi-channel concentric core de-multiplexer can be used on silicon photonics-based architectures that implement the de-multiplexer at a wafer level using beveled waveguides. With an architecture length between about 0.5 mm and 3.5 mm, the de-multiplexer can be used in on-chip silicon photonics design (e.g. silicon on insulator (SOI) design).

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. An SDM de-multiplexer comprising:
 a first core having a longitudinal axis, an input end and an output end, wherein the output end comprises an angled end face;
 a first cladding layer concentrically surrounding the first core, wherein the index of the first cladding layer is lower than the index of the first core;
 a second core having a longitudinal axis, an input end and an output end and an axial opening along the longitudinal axis of the second core, wherein the output end of the second core comprises an angled end face and wherein the first core is positioned within the axial opening of the second core;
 a second cladding layer concentrically surrounding the second core, wherein the index of the second cladding layer is lower than the index of the second core; and
 a first optical output fiber having an input end and an output end, wherein the input end of the first optical output fiber is coupled to the first cladding layer at the output end of the first core; and
 a second optical output fiber having an input end and an output end, wherein the input end of the second output fiber is coupled to the second cladding layer at the output end of the second core.

2. The SDM de-multiplexer of claim 1, wherein the first core and the second core are cylindrical in shape.

3. The SDM de-multiplexer of claim 1, wherein the angled end face of the first core is a planar surface disposed at an angle to the longitudinal axis of the first core.

4. The SDM de-multiplexer of claim 1, wherein the angled end face of the second core is a planar surface disposed at an angle to the longitudinal axis of the second core.

5. The SDM de-multiplexer of claim 1, wherein the angled end face of the first core and the angled end face of the second core together comprise a planar surface disposed at an angle to the longitudinal axis of the first core.

6. The SDM de-multiplexer of claim 1, wherein the longitudinal axis of the first core and the longitudinal axis of the second core are coaxially disposed.

7. The SDM de-multiplexer of claim 1, further comprising:
 a third core having a longitudinal axis and an output end and an axial opening along the longitudinal axis of the third core, wherein the output end comprises an angled face and wherein the second core is positioned within the axial opening of the third core.

8. The SDM de-multiplexer of claim 1, further comprising:
 a fourth core having a longitudinal axis and an output end and an axial opening along the longitudinal axis of the fourth core, wherein the output end comprises an angled face and wherein the third core is positioned within the axial opening of the fourth core.

9. A system for SDM communication comprising:
 at least one optical source configured to transmit optical energy;
 an SDM optical carrier fiber having an input end and an output end, wherein the input end of the SDM optical carrier fiber is positioned to couple optical energy from the at least one optical source and the output end of the SDM optical carrier fiber is configured to output a first SDM signal and a second SDM signal;
 a SDM de-multiplexer comprising
  a first core having a longitudinal axis, an input end and an output end, wherein the input end of the first core is positioned to couple the first SDM signal and wherein the output end of the first core comprises an angled end face,
  a first cladding layer concentrically surrounding the first core, wherein the index of the first cladding layer is lower than the index of the first core,
  a second core having a longitudinal axis, an input end, an output end and an axial opening along the longitudinal axis of the second core, wherein the output end of the second core comprises an angled end face, wherein the first core is positioned within the axial opening of the second core and wherein the input end of the second core is positioned to couple the second SDM signal, and
  a second cladding layer concentrically surrounding the second core, wherein the index of the second cladding layer is lower than the index of the second core;
 a first optical output fiber having an input end and an output end, wherein the input end of the first optical output fiber is positioned to couple the first SDM signal from the first cladding layer at the output end of the first core;
 a second optical output fiber having an input end and an output end, wherein the input end of the second output fiber is positioned to couple the second SDM signal from the second cladding layer at the output end of the second core; and
 a photodetector communicatively coupled to the output ends of the first and second optical output fibers and positioned to couple the first and second SDM signals from the output ends of the first and second optical output fibers.

10. The system for SDM communication of claim 9, wherein the first core and the second core of the SDM de-multiplexer are cylindrical in shape.

11. The SDM de-multiplexer of claim 9, wherein the angled end face of the first core of the SDM de-multiplexer is a planar surface disposed at an angle to the longitudinal axis of the first core.

12. The SDM de-multiplexer of claim 9, wherein the angled end face of the second core of the SDM de-multiplexer is a planar surface disposed at an angle to the longitudinal axis of the second core.

13. The SDM de-multiplexer of claim 9, wherein the angled end face of the first core and the angled end face of the second core of the SDM de-multiplexer together comprise a planar surface disposed at an angle to the longitudinal axis of the first core.

14. The SDM de-multiplexer of claim 9, wherein the longitudinal axis of the first core and the longitudinal axis of the second core of the SDM de-multiplexer are coaxially disposed.

15. The system for SDM communication of claim 9, wherein the SDM de-multiplexer further comprises a third core having a longitudinal axis and an output end and an axial opening along the longitudinal axis of the third core, wherein the output end comprises an angled face and wherein the second core is positioned within the axial opening of the third core.

16. The system for SDM communication of claim 9, wherein the SDM de-multiplexer further comprises a fourth core having a longitudinal axis and an output end and an axial opening along the longitudinal axis of the fourth core, wherein the output end comprises an angled face and wherein the third core is positioned within the axial opening of the fourth core.

* * * * *